US012735997B1

(12) United States Patent
Lefebvre et al.

(10) Patent No.: US 12,735,997 B1
(45) Date of Patent: Sep. 15, 2026

(54) EXHAUST CASE FOR AIRCRAFT ENGINE WITH STIFFENER REINFORCEMENT

(71) Applicant: PRATT & WHITNEY CANADA CORP., Longueuil (CA)

(72) Inventors: Guy Lefebvre, St-Bruno-de-Montarville (CA); François Doyon, Ste-Julie (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 19/310,698

(22) Filed: Aug. 26, 2025

(51) Int. Cl.
*F01D 25/24* (2006.01)

(52) U.S. Cl.
CPC .......... *F01D 25/24* (2013.01); *F05D 2220/32* (2013.01)

(58) Field of Classification Search
CPC . F01D 25/30; F02C 3/145; F02K 1/40; B64D 33/04
See application file for complete search history.

(56) References Cited

U.S. PATENT DOCUMENTS 2,516,819 A * 7/1950 Whittle .................. F01D 25/30 138/148
3,152,443 A 10/1964 Newland
4,040,249 A 8/1977 Kahle et al.
4,177,638 A 12/1979 Wood
4,765,751 A 8/1988 Pannone et al.
6,290,173 B1 9/2001 Nickels
8,099,943 B2 * 1/2012 Farber .................... F01D 25/30 60/39.5
8,965,728 B2 2/2015 Snider et al.
9,157,334 B2 10/2015 Grede et al.
9,316,108 B2 * 4/2016 Pegan, Jr. ............. F01D 25/162
9,381,787 B2 * 7/2016 Vignali .............. B60H 1/00564
9,944,393 B1 * 4/2018 Lorence ................. B63H 11/04
10,119,449 B2 11/2018 Boekeloo et al.
10,279,924 B2 * 5/2019 Rosado .................. B64D 33/04
10,514,003 B2 12/2019 Akcayoz et al.
10,697,076 B2 6/2020 Millward et al.
(Continued)

FOREIGN PATENT DOCUMENTS

CA 3084782 A1 3/2021
CA 3160067 A1 11/2022
(Continued)

*Primary Examiner* — Courtney D Heinle
*Assistant Examiner* — Cameron A Corday
(74) *Attorney, Agent, or Firm* — NORTON ROSE FULBRIGHT CANADA CORP.

(57) ABSTRACT

An exhaust system for an aircraft engine, has: a turbine exhaust duct (TED) having an annular inlet conduit and outlet conduits extending generally radially outward relative to the annular inlet conduit; an exhaust case surrounding the TED, the exhaust case having openings, each of the outlet conduits received through a respective one of the openings; and exhaust conduits secured to the exhaust case and each extending around a respective one of the openings of the exhaust case, an exhaust conduit of the exhaust conduits including a duct protruding away from the exhaust case along a port axis and fluidly communicating with a respective one of the outlet conduits, a stiffener disposed radially outwardly of the duct relative to the port axis and extending away from the exhaust case, and a reinforcement member secured to the stiffener to increase an effective thickness of the stiffener.

20 Claims, 6 Drawing Sheets

(56) References Cited

U.S. PATENT DOCUMENTS

| | | | | |
|---|---|---|---|---|
| 11,319,897 | B2 | 5/2022 | Joo et al. | |
| 11,719,165 | B2 | 8/2023 | Le Pape et al. | |
| 11,840,346 | B2 | 12/2023 | Ozóg | |
| 11,905,844 | B2 | 2/2024 | Kim et al. | |
| 11,959,390 | B2 * | 4/2024 | Savard | F02K 1/04 |
| 12,246,844 | B1 | 3/2025 | Weaver et al. | |
| 12,467,387 | B1 * | 11/2025 | Lefebvre | F01D 9/04 |
| 2009/0126366 | A1 | 5/2009 | Farber | |
| 2014/0047813 | A1 | 2/2014 | Frailich et al. | |
| 2014/0186167 | A1 | 7/2014 | Liles et al. | |
| 2015/0143816 | A1 | 5/2015 | Salunkhe et al. | |
| 2017/0067369 | A1 | 3/2017 | Hashimoto | |
| 2019/0031362 | A1 | 1/2019 | Petty, Sr. et al. | |
| 2021/0215121 | A1 | 7/2021 | Joo et al. | |
| 2022/0205369 | A1 * | 6/2022 | Kim | F01D 25/30 |
| 2022/0260001 | A1 | 8/2022 | Lefebvre et al. | |
| 2023/0138749 | A1 | 5/2023 | Durocher et al. | |
| 2024/0150030 | A1 * | 5/2024 | Legras | F01D 25/30 |

FOREIGN PATENT DOCUMENTS

| | | | |
|---|---|---|---|
| CA | 3180641 | A1 | 4/2023 |
| CA | 2915658 | C | 10/2023 |
| EP | 3299592 | B1 | 3/2020 |
| EP | 4174287 | A1 | 5/2023 |
| EP | 4047191 | B1 | 9/2024 |
| EP | 4563792 | A1 | 6/2025 |
| KR | 20210086234 | A | 7/2021 |
| KR | 102697340 | B1 | 8/2024 |
| KR | 20220093987 | B1 | 9/2025 |

* cited by examiner

EXHAUST CASE FOR AIRCRAFT ENGINE WITH STIFFENER REINFORCEMENT

TECHNICAL FIELD

The application relates generally to aircraft engines and, more particularly, to exhaust cases of such engines.

BACKGROUND

Exhaust ducts are disposed downstream of turbine sections and are configured for evacuating combustion gases that have been used to power the turbine sections. These combustion gases are hot and care should be taken to ensure that the exhaust ducts sustain these harsh conditions. Existing exhaust ducts are satisfactory to some extend, but improvements are always sought.

SUMMARY

In one aspect, there is provided an exhaust system for an aircraft engine, comprising: a turbine exhaust duct (TED) having an annular inlet conduit extending around a central axis for directing combustion gases generally in an axial direction, and outlet conduits fluidly communicating with the annular inlet conduit and extending generally radially outward relative to the annular inlet conduit; an exhaust case surrounding the TED, the exhaust case having openings, each of the outlet conduits received through a respective one of the openings; and exhaust conduits secured to the exhaust case and each extending around a respective one of the openings of the exhaust case, an exhaust conduit of the exhaust conduits including a duct protruding away from the exhaust case along a port axis and fluidly communicating with a respective one of the outlet conduits, a stiffener disposed radially outwardly of the duct relative to the port axis and extending away from the exhaust case, and a reinforcement member secured to the stiffener to increase an effective thickness of the stiffener.

The exhaust system for an aircraft engine described above may include any of the following features, in any combinations.

In some embodiments, the exhaust conduit includes a flange interconnecting the stiffener to the duct, the flange secured to the exhaust case.

In some embodiments, the reinforcement member is secured to the stiffener via a weld or braze joint.

In some embodiments, the reinforcement member includes two sections each extending from a forward end to a rearward end relative to a direction of travel of an aircraft equipped with the aircraft engine, the forward ends and the rearward ends being separated from each other via gaps.

In some embodiments, the reinforcement member is secured to an outer face of the stiffener, the outer face oriented away from the port axis.

In some embodiments, a thickness of the reinforcement member is greater than that of the stiffener, the thickness taken along a direction being normal to a contact plane between the reinforcement member and the stiffener.

In some embodiments, a height of the reinforcement member is greater than or equal to that of the stiffener, the height taken in a direction normal to the exhaust case.

In some embodiments, the stiffener, the duct, and the flange are parts of a single monolithic body of the exhaust conduit.

In some embodiments, outlet ends of the outlet conduits are secured to the exhaust conduits.

In some embodiments, a portion of a respective one of the outlet conduits extends inside the duct.

In another aspect, there is provided a reverse-flow gas turbine engine for an aircraft engine, comprising: an outer case assembly extending around a central axis and enclosing a core, the core including a compressor section and a turbine section, the turbine section located forward of the compressor section relative to a direction of travel of the aircraft engine, the outer case assembly including an exhaust case defining openings; and a turbine exhaust duct (ted) having an annular inlet conduit extending around the central axis for directing combustion gases generally in an axial direction and outlet conduits communicating with the annular inlet conduit and extending generally radially outward relative to the annular inlet conduit; exhaust conduits secured to the exhaust case and each extending around a respective one of the openings of the exhaust case, the exhaust conduits secured to the exhaust case via flanges thereof, the exhaust conduits further including stiffening lips extending transversally to the exhaust case and extending at least partially around the openings; and reinforcement members secured to the stiffening lips and configured to increase a stiffness of the exhaust case.

The reverse-flow gas turbine engine for an aircraft engine described above may include any of the following features, in any combinations.

In some embodiments, the exhaust conduits include ducts communicating with the outlet conduits and flanges interconnecting the stiffening lips to the ducts, the flanges secured to the exhaust case.

In some embodiments, the reinforcement members are secured to the stiffening lips via weld or braze joints.

In some embodiments, each of the reinforcement members includes two sections each extending from a forward end to a rearward end relative to the direction of travel, the forward ends and the rearward ends being separated from each other via gaps.

In some embodiments, the reinforcement members are secured to outer faces of the stiffening lips, the outer faces oriented away from the outlet conduits.

In some embodiments, a thickness of the reinforcement members is greater than that of the stiffening lips, the thickness taken along a direction being normal to contact planes between the reinforcement members and the stiffening lips.

In some embodiments, a height of the reinforcement members is greater than or equal to that of the stiffening lips, the height taken in a direction normal to the exhaust case.

In some embodiments, each of the exhaust conduits is a single monolithic body defining a respective one of the stiffening lips, a respective one of the ducts, and a respective one of the flanges.

In some embodiments, outlet ends of the outlet conduits are secured to the exhaust conduits.

In some embodiments, a portion of a respective one of the outlet conduits extends inside the duct.

DESCRIPTION OF THE DRAWINGS

Reference is now made to the accompanying figures in which.

DETAILED DESCRIPTION

Figure 1:
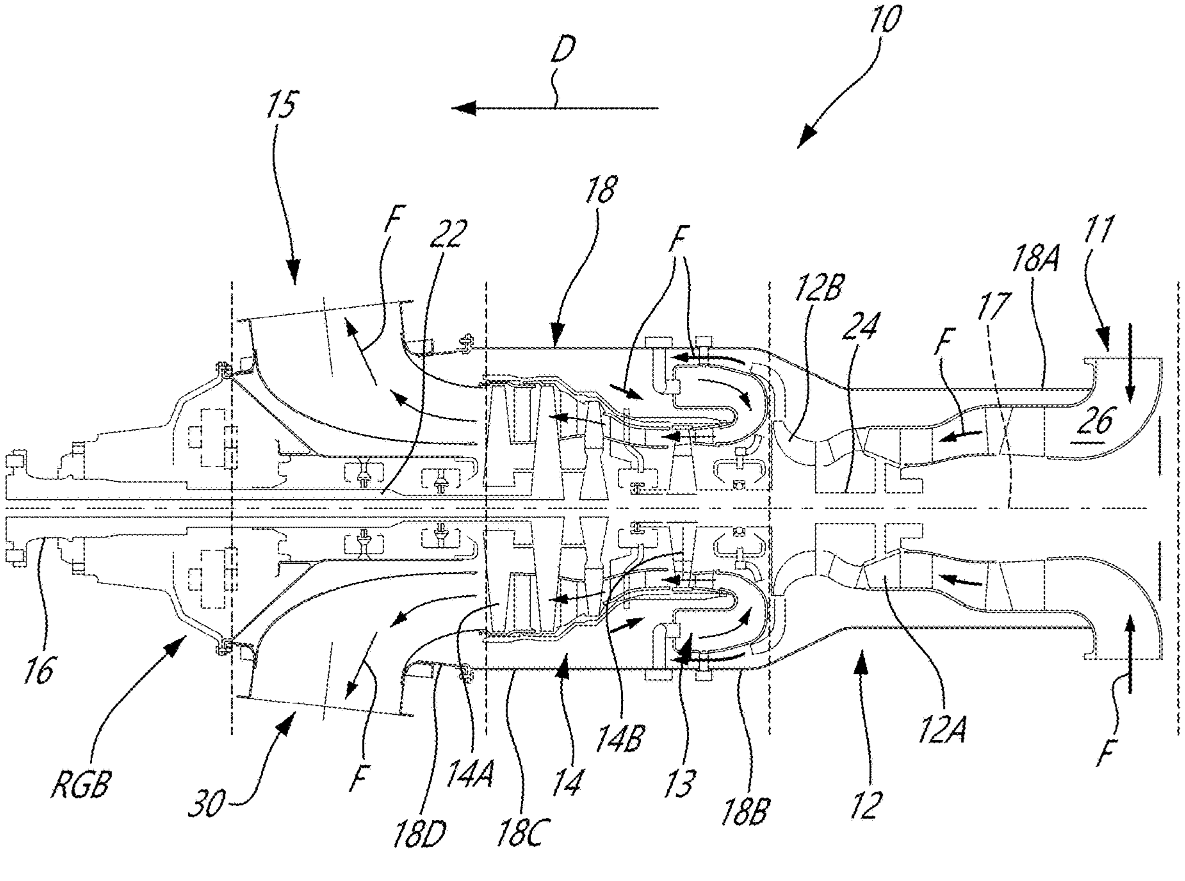
FIG. 1 is a schematic cross-sectional view of an aircraft engine depicted as a turboprop gas turbine engine.

FIG. 1 illustrates an aircraft engine depicted as a gas turbine engine 10 of a type preferably provided for use in subsonic flight, generally comprising in serial flow communication an air inlet 11, a compressor section 12 for pressurizing the air from the air inlet 11, a combustor 13 in which the compressed air is mixed with fuel and ignited for generating an annular stream of hot combustion gases, a turbine section 14 for extracting energy from the combustion gases, an exhaust system 15 through which the combustion gases exit the gas turbine engine 10. The gas turbine engine 10 has a central axis 17. The gas turbine engine 10 in FIG. 1 is a turboprop engine and includes an output shaft 16, which may drive a propulsor, such as a rotor or propeller, for providing thrust for flight and taxiing. It is understood that the gas turbine engine 10 can adopt various other configurations. For instance, the gas turbine engine could be configured as a turboshaft engine having an output shaft connectable to a rotatable load, such as a helicopter rotor or the like.

The gas turbine engine 10 has an outer case assembly 18 housing a central core through which gases flow and which includes most of the turbomachinery of the gas turbine engine 10. The illustrated gas turbine engine 10 is a "reverse-flow" engine 10 because gases flow through the core from the air inlet 11 at a rear or aft portion of the gas turbine engine 10, to the exhaust system 15 at a front portion of the gas turbine engine 10. This is in contrast to "through-flow" gas turbine engines in which gases flow through the core of the gas turbine engine from a front portion to a rear portion. The direction of the flow of gases through the gas turbine engine 10 is shown in FIG. 1 with arrows F.

It will thus be appreciated that the expressions "forward" and "aft" used herein may refer to the relative disposition of components of the gas turbine engine 10, in correspondence to the "forward" and "aft" directions of the gas turbine engine 10 and aircraft including the gas turbine engine 10 as defined with respect to a direction of travel D. In the embodiment shown, a component of the gas turbine engine 10 that is "forward" of another component is arranged within the gas turbine engine 10 such that it is located closer to the output shaft 16. Similarly, a component of the gas turbine engine 10 that is "aft" of another component is arranged within the gas turbine engine 10 such that it is further away from the output shaft 16.

Still referring to FIG. 1, the core of the gas turbine engine 10 may include one or more spools. The illustrated embodiment is a two-spool engine including a low pressure (LP) spool and a high pressure (HP) rotatable about the central axis 17 to perform compression to pressurize the air received through the air inlet 11, and to extract energy from the combustion gases before they exit the core via the exhaust system 15 at a forward end of the core. The core may include other components as well, including, but not limited to internal combustion engines (e.g. rotary engines such as Wankel engines for compounding power with a turbine of the turbine section), gearboxes, tower shafts, and bleed air outlets.

Each spool generally includes at least one component to compress the air that is part of the compressor section 12, and at least one component to extract energy from the combustion gases that is part of the turbine section 14. More particularly, according to the illustrated embodiment, the LP spool has an LP turbine 14A which extracts energy from the combustion gases, and an LP compressor 12A for pressurizing the air. The LP turbine 14A and the LP compressor 12A can each include one or more stages of rotors and stators, depending upon the desired engine thermodynamic cycle, for example. The LP spool further comprises an LP shaft 22 drivingly connecting the LP turbine 14A to the LP compressor 12A. Gears (not shown) can be provided to allow the LP compressor 12A to rotate at a different speed than the LP turbine 14A. The LP turbine 14A may also drivingly connected to the output shaft 16 via a gearbox RGB.

Still referring to FIG. 1, the HP spool comprises an HP turbine 14B drivingly engaged (e.g. directly connected) to a HP compressor 12B by a high pressure shaft 24. Similarly to the LP turbine 14A and the LP compressor 12A, the HP turbine 14B and the HP compressor 12B can each include one or more stages of rotors and stators. The LP compressor 12A, the HP compressor 12B, the combustor 13, the HP turbine 14B and the LP turbine 14A are in serial flow communication via a gas path 26 being annular and extending through the core about the central axis 17. The gas path 26 leads to the exhaust system 15 downstream of the turbine section 14.

The outer case assembly 18 includes a plurality of cases disposed along the central axis 17 of the gas turbine engine 10. These cases are secured to one another at mating flanges using suitable fastening means, such as nuts and bolts. Any fastening means are contemplated. The outer case assembly 18 includes a compressor case 18A enclosing the compressor section 12, a combustor case 18B enclosing the combustor 13, a turbine case 18C enclosing the turbine section 14, and an exhaust case 18D being part of the exhaust system 15.

Figure 2:
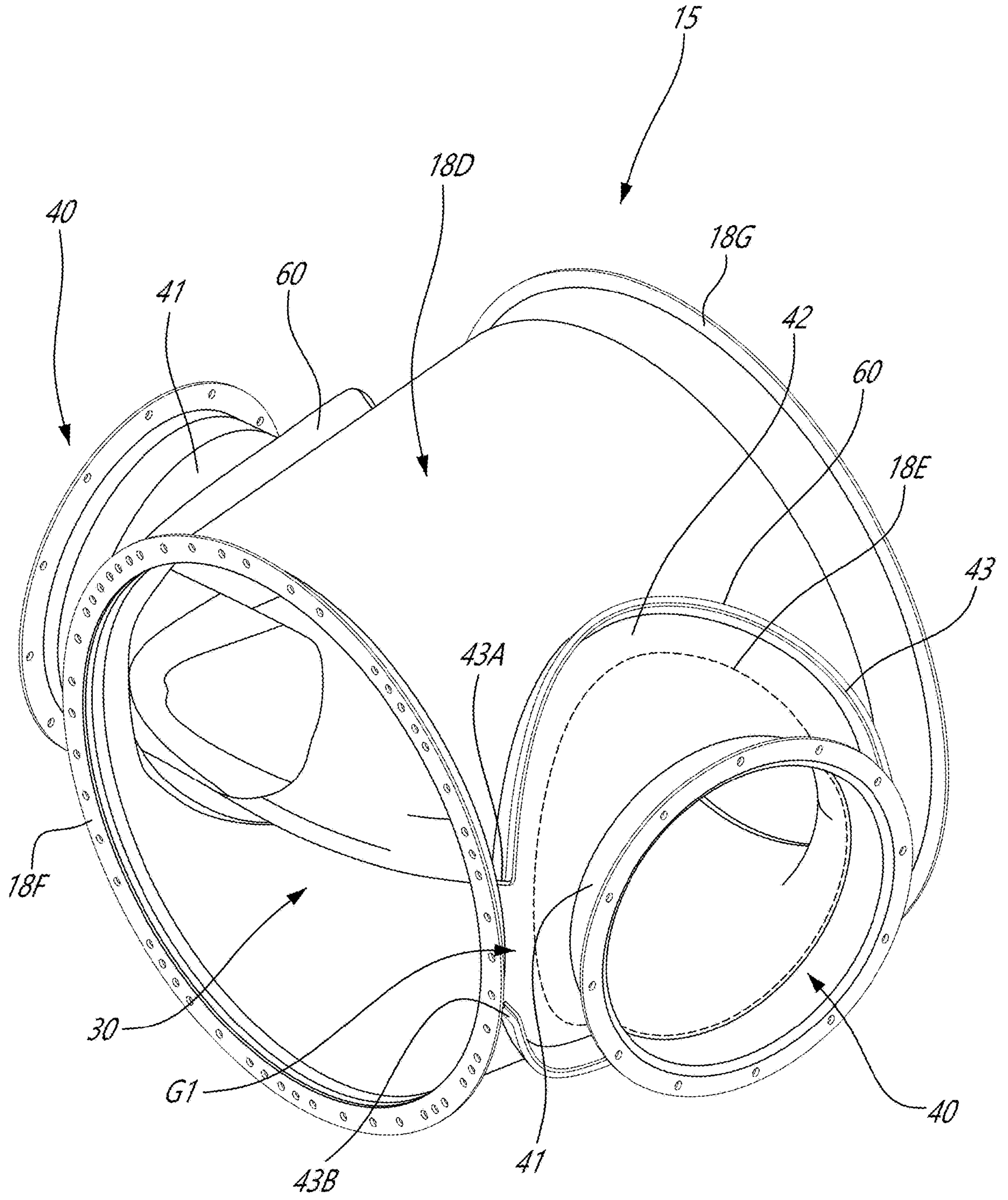
FIG. 2 is a three dimensional view of an exhaust system of the aircraft engine of FIG. 1.
Figure 3:
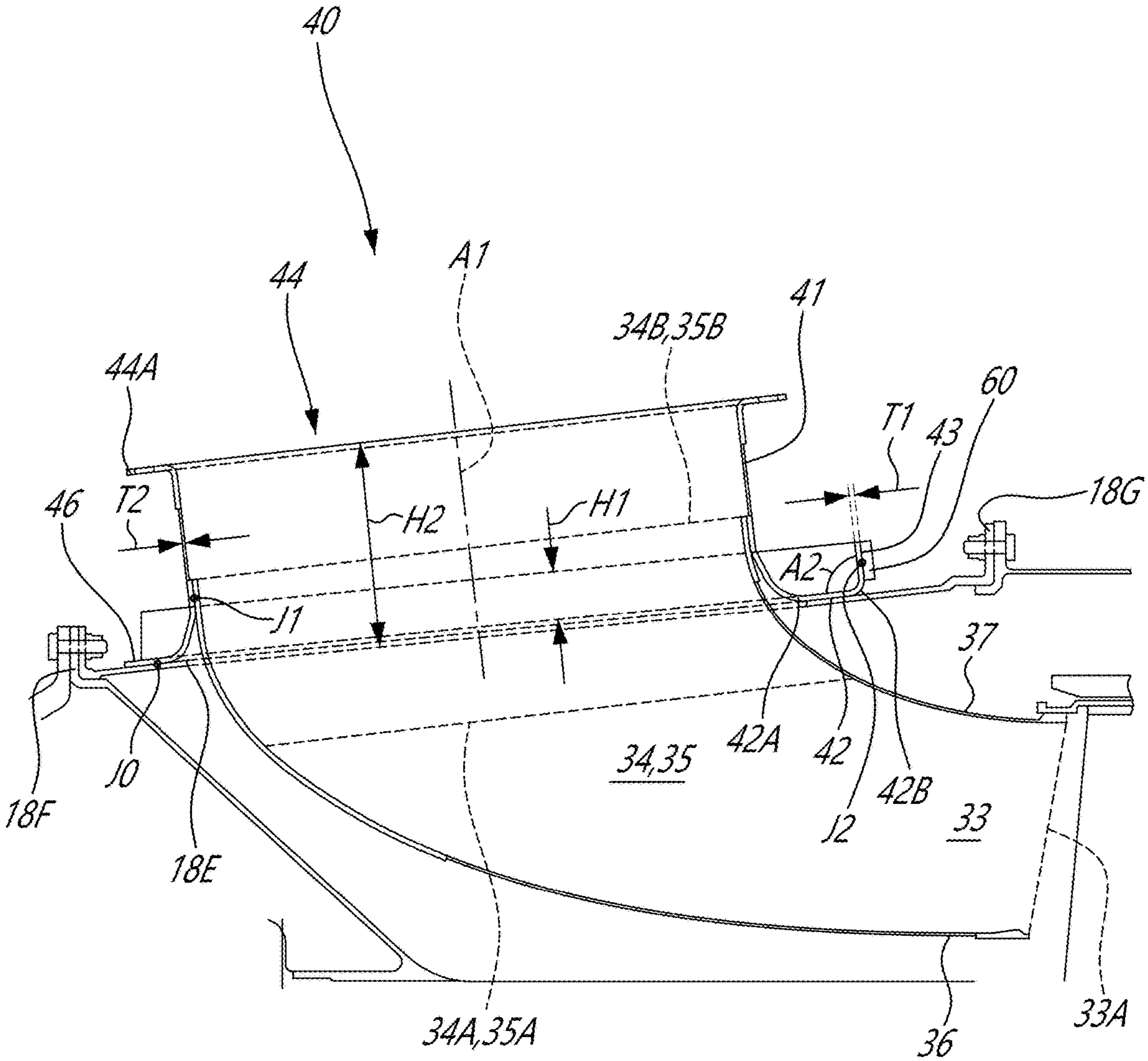
FIG. 3 is a cross-sectional view of the exhaust system of FIG. 2.

Referring to FIGS. 1-3, the exhaust system 15 of the gas turbine engine 10 comprises a turbine exhaust duct (TED) 30 secured to the exhaust case 18D. The exhaust case 18D extends circumferentially around the central axis 17 and defines openings 18E, two openings in this embodiment, sized for receiving portions of the turbine exhaust duct 30 that will be described below. The two openings 18E may be diametrically opposed to one another. More or less than two openings may be used in some embodiments.

Figure 4:
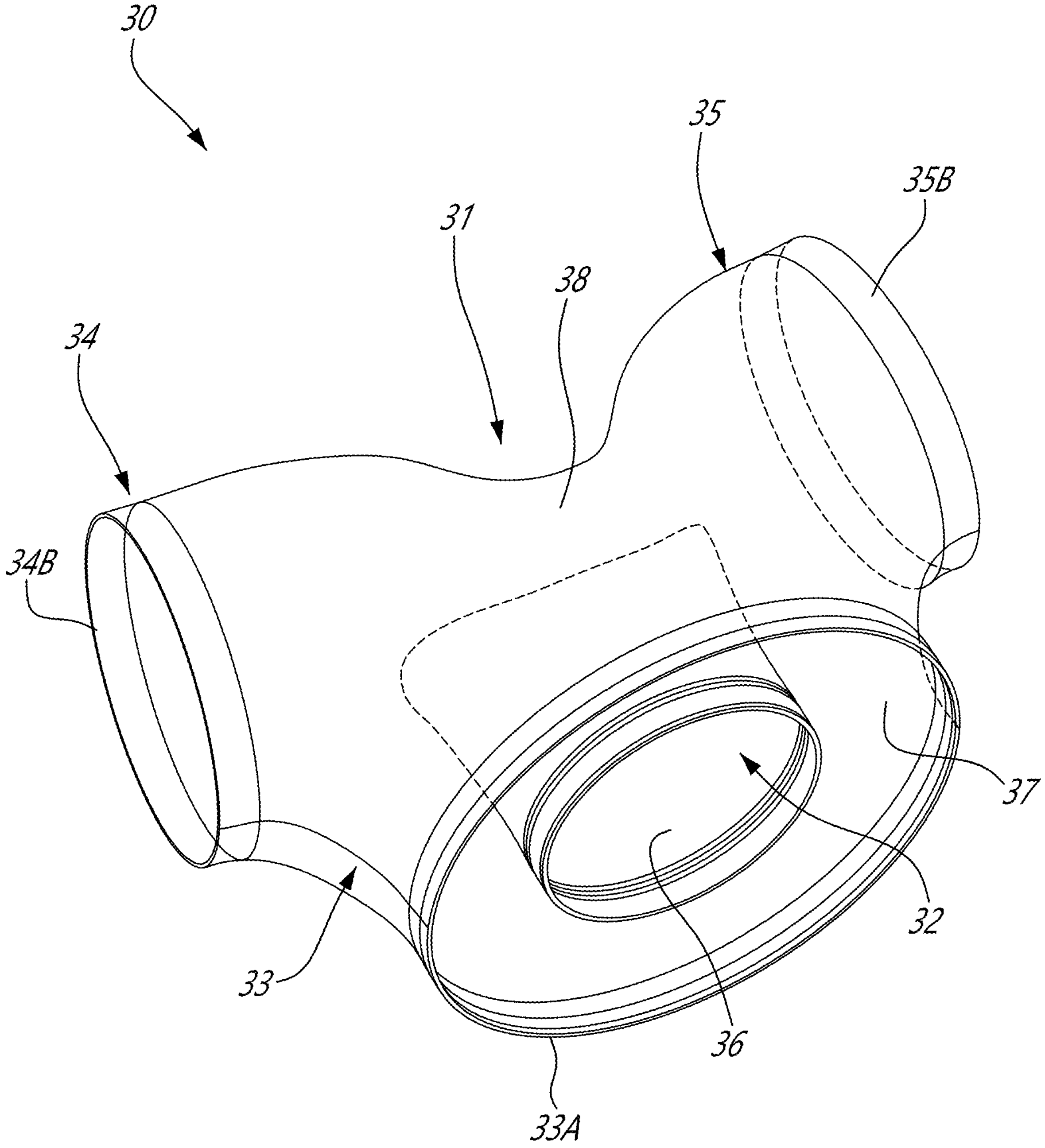
FIG. 4 is a three dimensional view of a turbine exhaust duct of the exhaust system of FIG. 3.
Figure 5:
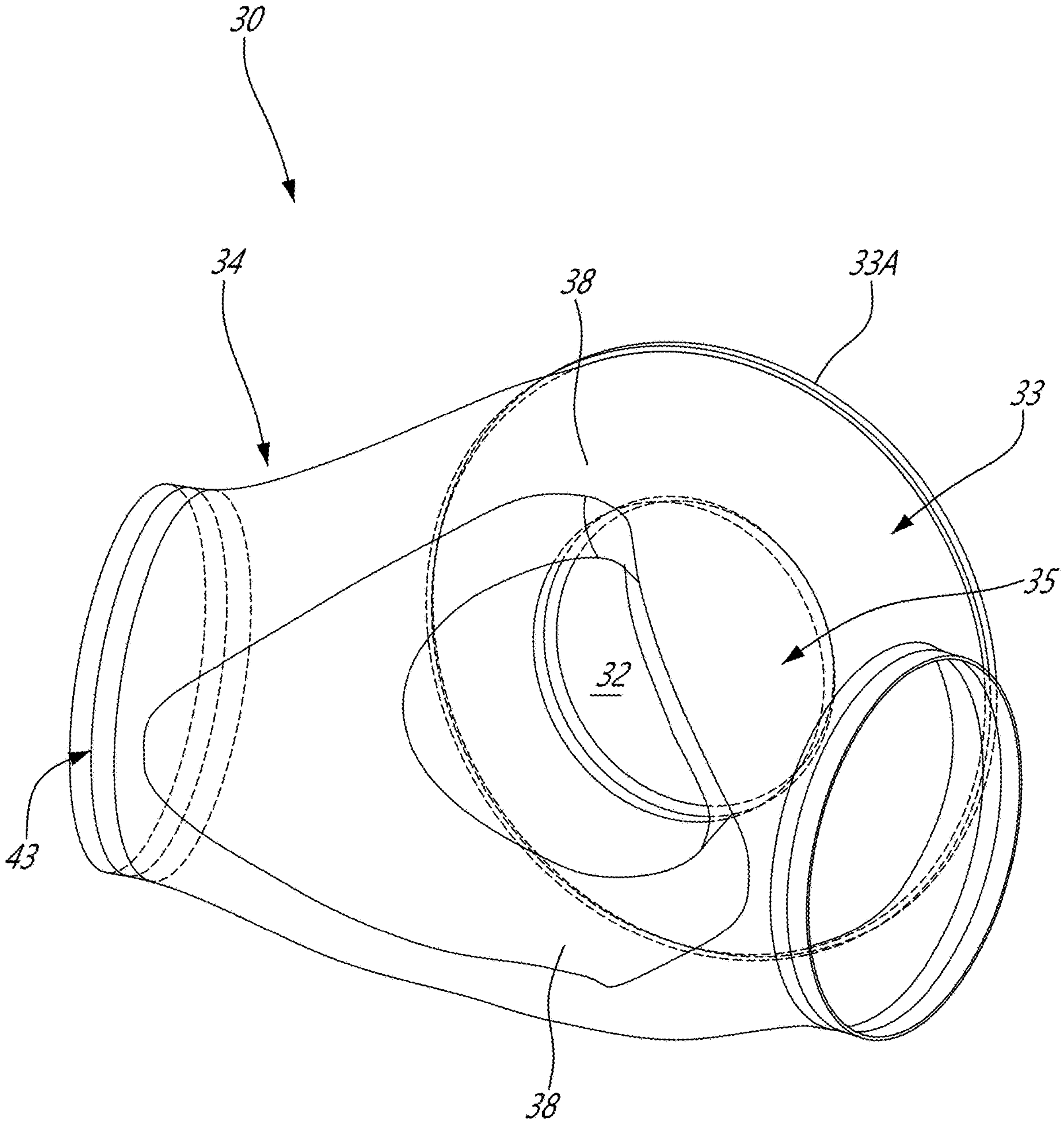
FIG. 5 is another three dimensional view of the turbine exhaust duct of FIG. 4.
Figure 6:
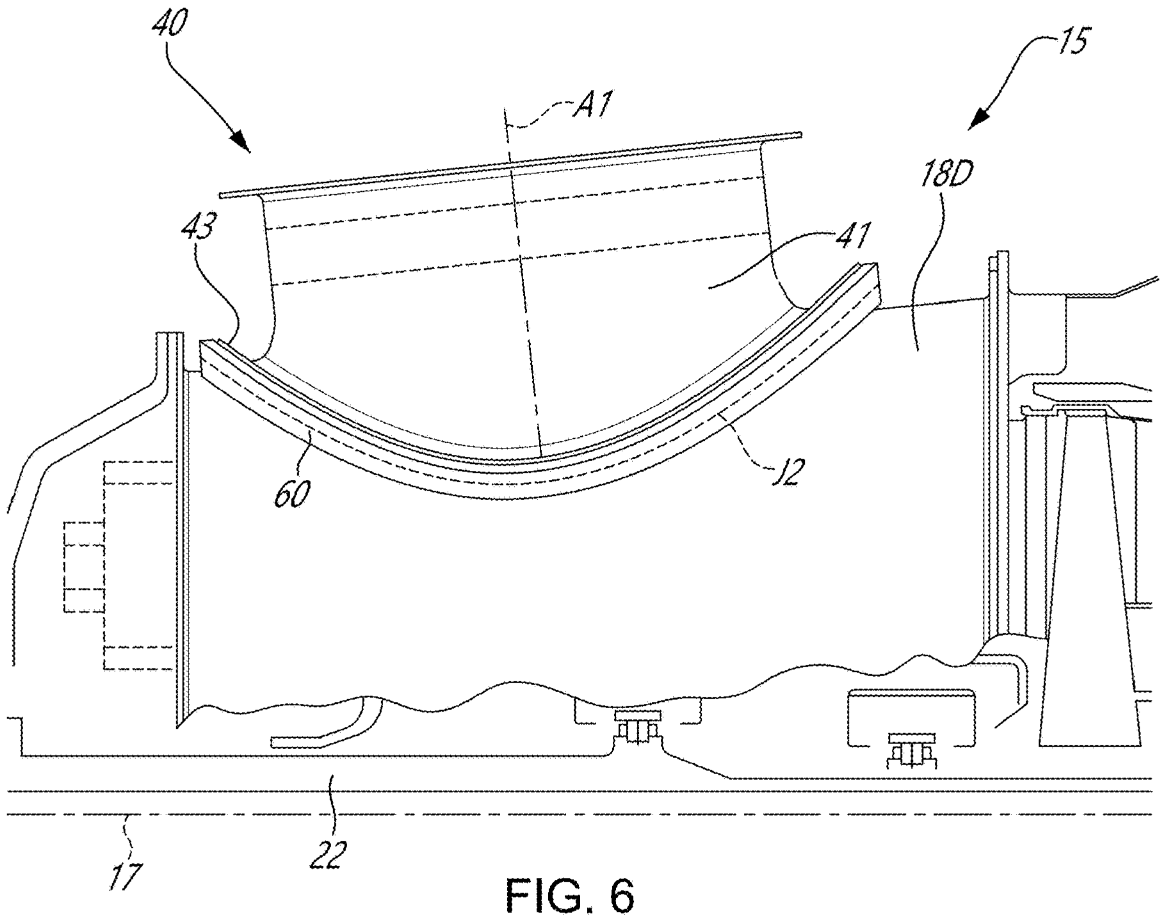
FIG. 6 is a side partially transparent view of the exhaust system of FIG. 2.

Referring now to FIGS. 4-5, the turbine exhaust duct 30 is described in more detail. The turbine exhaust duct 30 is used for exhausting combustion gases received from the last stage of the LP turbine 14A. According to the illustrated embodiment, the turbine exhaust duct 30 is a non-axisymmetric dual port exhaust duct configured for directing combustion gases laterally on opposed sides of the outer case assembly 18 of the gas turbine engine 10. The turbine exhaust duct 30 is qualified as "non-axisymmetric" because the two exhaust ports thereof are not coaxial to the central axis 17 of the gas turbine engine (i.e., the exhaust flow discharged from the exhaust duct is not axial, it is rather directed in a direction that diverges from the central axis 17). According to at least some embodiments, the TED 30 has a generally "Y-shaped" body including an inlet conduit 33 extending axially around the central axis 17 for receiving the annular flow of combustions gases discharged from the last stage of LP turbine 14A, and first and second outlet conduits 34, 35 branching off laterally from the inlet conduit 33. According to some embodiments, the first and second outlet conduits 34, 35 are identical.

As can be appreciated from FIG. 1, the downstream end of each outlet conduit 34, 35 projects outwardly of the exhaust case 18D. As best shown in FIG. 3, each outlet conduit 34, 35 terminates into an exhaust port. The outlet conduits extend along respective axes that intersect the central axis 17. According to the illustrated embodiment, these axes has a main radial component and a secondary (i.e., smaller) axial component relative to the central axis 17. Stated differently, the exhaust ports of the outlet conduits 34, 35 are oriented to direct the combustion gases mainly in a radially outward direction. According to some embodiments, the exhaust port opening of the outlet conduits 34, 35 are circular. However, it is understood that other geometries are contemplated as well (e.g., oval).

Referring to FIGS. 3-5, the turbine exhaust duct 30, in this embodiment is a dual ports exhaust duct, and is formed by a generally Y-shaped body 31. The body 31 defines a fluid flow passage(s) about a central bore 32 for accommodating a shaft engine. The fluid flow passage of the annular body 31 generally includes the inlet conduit 33 through which the bore 32 extends, and in this example the two outlet conduits 34, 35 branching off from the inlet conduit 33 and extending radially away therefrom relative to the central axis 17. It is understood that the inlet and outlet conduits 33, 34, 35 may adopt various configurations. For instance, they can take the form of cylindrically straight or curved conduits. If desired the body 31 may include more than two outlet conduits. The inlet conduit 33 may be provided in the form of an annular inlet conduit 33 wherein the inlet conduit 33 is connected to and communicates with the outlet conduits 34, 35. The outlet conduits 34, 35 may not be perpendicularly positioned relative to the inlet conduit 33 (i.e. be purely radially oriented with respect thereto), but rather may extend both radially and axially with respect thereto. Therefore, the body 31 could adopt various configurations including T-shaped and Y-shaped configurations. It is understood that any suitable configurations for the inlet and exhaust conduits may be used.

The inlet conduit 33 includes an inlet end 33A located adjacent the turbine section 14 for receiving combustion gases therefrom. The outlet conduits 34, 35 are generally cylindrical in shape in this example (though any suitable shape may be employed) and have respective outlet centerlines which extend at an angle relative to each other. As shown in FIG. 4, the outlet conduits 34, 35 have corresponding inlet ends 34A, 35A (FIG. 3) and outlet ends 34B, 35B. The inlet ends 34A, 35A are defined at the intersection between the inlet conduit 33 and the outlet conduits 34, 35, as shown schematically by the dotted lines in FIG. 3.

Still referring to FIGS. 4-5, the inlet conduit 33 is annular about the central axis 17, which also defines the central axis of the inlet conduit 33. The inlet conduit 33 is defined by an inner peripheral wall 36 and an outer peripheral wall 37. The outer peripheral wall 37 is a circumscribing wall of the inlet conduit 33, and constitutes a periphery of the inlet conduit 33. The inlet conduit 33 may include two circumferentially spaced-apart splitters 38. The splitters 38 may take the form of raises or bumps formed inside the body 31 at a bottom of the inlet conduit 33 and project in a direction toward the central axis 17. The splitters 38 are configured to split the inlet flow in two to direct the two flows towards the outlet conduits 34, 35. The splitters 38 may be omitted in some configurations.

As shown in FIGS. 4-5, the outer peripheral wall 37 and the inner peripheral wall 36 are connected to one another at outlet ends 34B, 35B of the outlet conduits 34, 35. It may therefore be said that the outlet conduits 34, 35 are defined conjointly by the inner peripheral wall 36 and the outer peripheral wall 37. In other words, the inner peripheral wall 36 and the outer peripheral wall 37 are cylindrically shaped at the inlet end 33A of the inlet conduit 33 and their shape diverge from the central axis 17 and merge together to conjointly define the outlet ends 34B, 35B of the outlet conduits 34, 35.

During engine operation, loads are transmitted to the exhaust system 15. For instance, loads may be transmitted from a gearbox, which drivingly engages the LP shaft 22 to the propeller. The rigidity of the exhaust case 18D is selected to support these loads and to reduce bending to a minimum. The exhaust case 18D is typically made from a sheet metal frame, which can be either cylindrical or conical to meet rigidity requirements. However, the exhaust system 15 has a dual port gas path, referred to as the turbine exhaust duct 30, that exit through the exhaust case 18D. The presence of the two exit ports, namely the two openings 18E, on either side of the exhaust case 18D may affect its rigidity and structural integrity. To increase the stiffness of the exhaust case 18D, the structure may be re-enforced so as to reduce the deformation around the openings 18E as will be described below. Moreover, the inventors further observed that most of the deformation occurs at specific locations around the openings 18E.

Referring back to FIGS. 2-3, the exhaust system 15 further includes exhaust conduits 40, two in the depicted embodiment, one for each of the outlet conduits 34, 35 of the turbine exhaust duct 30, secured to the exhaust case 18D and each extending around a respective one of the openings 18E of the exhaust case 18D. The exhaust conduits 40 each includes a duct 41 protruding away from the exhaust case 18D and communicating with a respective one of the outlet conduits 34, 35. The exhaust conduits 40 also includes a flange 42 flaring away from one end of the duct 41. In this embodiment, the exhaust conduits 40 are secured to the exhaust case 18D via their respective flanges 42. To this end, a first weld (or braze) joint J0 may be located between the flange 42 and the exhaust case 18D. The first weld joint J0 may extend a full periphery of the opening 18E. Other fastening means are contemplated (e.g., mechanical fasteners, such as bolts). The first weld joint J0 may include a plurality of separate weld joints distributed around the opening 18E. To increase a stiffness of the exhaust system 15, the exhaust conduit 40 may each include a stiffener 43 protruding transversally from the flange 42. The flange 42 may thus be said to be located between the duct 41 and the stiffener 43. The flange 42 is located radially between the duct 41 and the stiffener 43 relative to a port axis A1 (FIG. 3) of the exhaust conduit 40. The stiffener 43 may be referred to as a stiffening lip.

As shown in FIG. 3, the flange 42 extends from a radially-inner end 42A to a radially-outer end 42B relative to the port axis A1. The flange 42 defines a contact surface with an outer face of the exhaust case 18D. The flange 42 may therefore extend a full periphery of the opening 18E and curves to follow a frustoconical shape of the exhaust case 18D. The duct 41 protrudes transversally from the radially-inner end 42A of the flange 42, whereas the stiffener 43 protrudes transversely from the radially-outer end 42B of the flange 42. Both of the duct 41 and the stiffener 43 extend away from the exhaust case 18D in a generally radially outward direction relative to the central axis 17 of the gas turbine engine 10. In the embodiment shown, the duct 41, the flange 42, and the stiffener 43 are parts of a single monolithic body of the exhaust conduit 40. However, they may be otherwise assembled from separated parts using any suitable process, such as welding, brazing, or mechanical fastening. As shown in FIG. 3, an exhaust ring 44 is secured to an end of the duct 41. The exhaust ring 44 may define a flange 44A for securement to, for instance, a nacelle or other parts of the gas turbine engine 10.

In the embodiment shown, a portion of the outlet conduit 34, 35 of the turbine exhaust duct 30 extends inside the ducts 41 of the exhaust conduit 40. In other words, an overlap is defined between the ducts 41 of the exhaust conduits 40 and the outlet conduits 34, 35 of the turbine exhaust duct 30. The ducts 41 may be secured to the outlet conduits 34, 35 at the overlap therebetween using, for instance, a second weld (or braze) joint J1, which may either be fully continuous all around the outlet conduits 34, 35, or may include a plurality of separate joints distributed therearound.

In the embodiment shown, an angle A2 between the stiffener 43 and the flange 42 is at least 90 degrees. The angle A2 may be decreased or increased to meet stiffness requirements. The stiffener 43 may have a height H1 taken along the port axis A1 of the exhaust conduit 40 being less than an overall height H2 of the exhaust conduit 40. The overall height H2 may correspond to a height of the duct 41. In some embodiments, a thickness T1 of the stiffener 43 is greater than a thickness T2 of the duct 41. The thickness T1 of the stiffener 43 may be tuned based on rigidity requirements.

The height H1 of the stiffener 43 corresponds to at least a radial span of the flange 42 taken from its radially-inner end to its radially-outer end and relative to central axes of the outlet conduits 34, 35. The thickness T1 may range from the thickness of the exhaust case 18D to about 2.5 to 3 times the thickness of the exhaust case 18D.

Referring more particularly to FIG. 2, in this embodiment, the stiffener 43 may extend around the duct 41 from a first end 43A to a second end 43B. A gap G1 is defined between the first end 43A and the second end 43B. The gap G1 is free of the stiffener 43. This gap G1 is aligned with a closest location between the flange 42 of the exhaust conduit 40 and a forward mounting flange 18F of the exhaust case 18D. The forward mounting flange 18F is located at a forward end of the exhaust case 18D opposite a rearward mounting flange 18G. Put differently, the interruption or gap G1 in the stiffener 43 is designed to accommodate the forward mounting flange 18F of the exhaust case 18D. In some other embodiments, the stiffener 43 may extend a full periphery around the duct 41.

The exemplified stiffener 43 may increase an overlap stiffness of the exhaust system 15 while minimizing weight increase to allow the exhaust system 15 to withstand the loads and hot combustion gases it is subjected to.

However, in some embodiments, for instance when the gas turbine engine 10 includes a heavier gearbox at a front end thereof, it may be desired to further increase a rigidity of the exhaust case 18D. To do so, the exhaust system 15 further includes a reinforcement member 60 configured to increase a stiffness of the exhaust case 18D. The reinforcement member 60 may be secured to the stiffener 43 to increase an effective thickness of the stiffener 43. In the context of the present disclosure, the expression "effective" as in "effective thickness" refers to an overall thickness value of the stiffener 43 when taking into account the structural contribution of the reinforcement member 60. This value is not necessarily the actual physical thickness of the stiffener 43 alone, but rather a calculated or perceived thickness that reflects the combined stiffness, load-bearing capacity, or bending resistance provided by both the stiffener 43 and the reinforcement member 60 secured thereto. In other words, the reinforcement member 60 may make the stiffener 43 behave, in terms of rigidity or strength, as though it were physically thicker than its actual unreinforced dimension.

Figure 7:
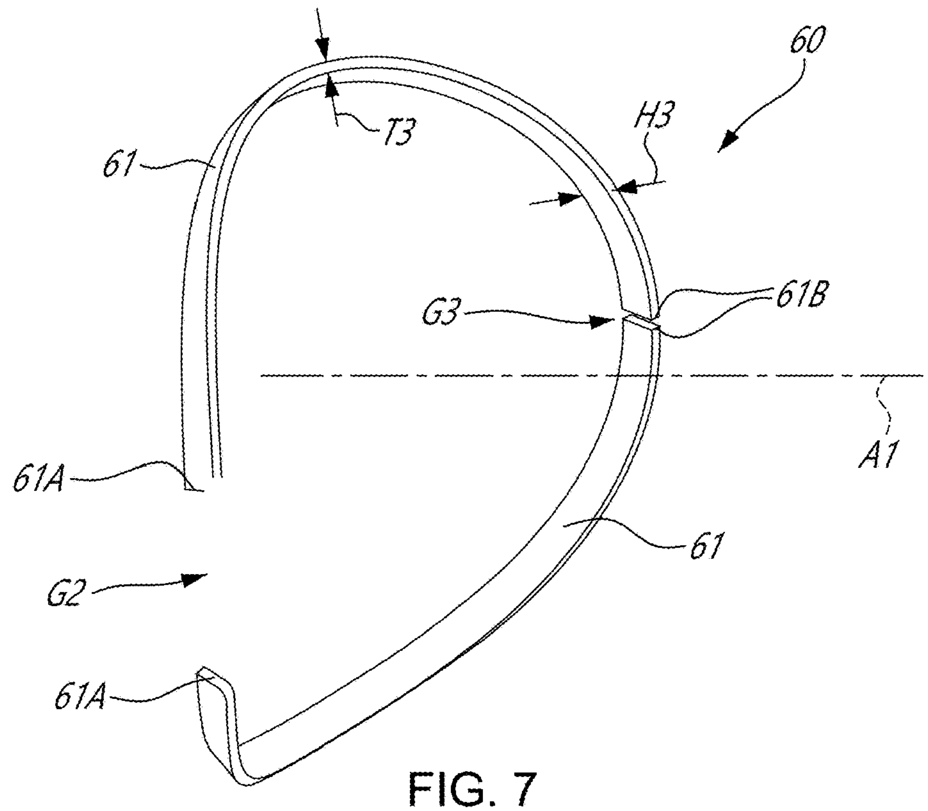
FIG. 7 is at three-dimensional view illustrating a stiffener reinforcement for the exhaust system of FIG. 2.

Referring more particularly to FIG. 7, an example of the reinforcement member 60 is described in greater detail. The reinforcement member 60 may include two sections 61, which may be mirror images of one another. Each of the two sections 61 may be disposed on a respective side of a plane containing the central axis 17 and containing the port axis A1. Each of the two sections 61 extends from a forward end 61A to a rearward end 61B. The forward end 61A is located proximate the forward mounting flange 18F whereas the rearward end 61B is located proximate the rearward mounting flange 18G. As shown in FIG. 7, the forward ends 61A and the rearward ends 61B are separated from each other via a forward gap G2 and a rearward gap G3. Put differently, the two sections 61 are devoid of direct connection to one another and they may be solely secured to the associated stiffener 43. These gaps G2, G3 may facilitate an installation of the reinforcement member 60 to the exhaust conduits 40. However, in some embodiments, the reinforcement member 60 may be a single member annularly extending around the port axis A1. This single member may be fully annular, that is, devoid of a gap, or may include a single gap to facilitate installation, or instance, that would register with the gap G1 defined between the first end 43A and the second end 43B of the stiffener 43.

The two sections 61 may be secured directly to the stiffener 43 via a third weld or braze joint J2. It will be appreciated that the joint J2 may be a continuous joint extending substantially entirely the length of each of the two sections 61 from the forward end 61A to the rearward end 61B. Alternatively, the joint J2 may be a plurality of joints distributed and spaced apart from one another along the length of each of the two sections 61. In other words, the joint J2 may be either a seam weld or a tack weld.

In some embodiments, the two sections 61 of the reinforcement member 60 may be secured to an outer face of the stiffener 43; the outer face oriented away from the port axis A1. Alternatively, the two sections 61 may be secured to an inner face of the stiffener 43 oriented towards the port axis A1. In some embodiments, the two sections 61 may each have an L-shape, with a portion secured to the exhaust case 18D and another portion secured to the stiffener 43. Other configurations are contemplated.

Still referring to FIG. 7, in some embodiments, a thickness T3 of the reinforcement member 60 and of the two sections 61, is greater than the thickness T1 (FIG. 3) of the stiffener 43. The thicknesses T1, T3 are taken along a direction being normal to a contact plane between the reinforcement member 60 and the stiffener 43. In other words, the thicknesses T1, T3 may extend in a substantially radial direction relative to the port axis A1. The two sections 61 of the reinforcement member 60 may have a height H3, which may be greater than or equal to the height H1 (FIG. 3) of the stiffener 43. The heights H1, H3 are taken in a direction normal to the exhaust case 18D. This direction may be substantially axial relative to the port axis A1. It will be appreciated that the thickness T3 and the height H3 are selected as a function of the desired rigidity of the exhaust case 18D.

The disclosed reinforcement member 60 may allow to increase the rigidity of the exhaust case 18D to meet requirements while minimizing weight increase of the exhaust system 15. The reinforcement member 60 overlap areas around the openings 18E that are more prone to deformation under load. Increasing the thickness of the sheet metal used for the stiffener 43 may be unsuitable because it might increase the weight above a weight threshold. The disclosed reinforcement member 60 may allow to meet both of the stiffness and the weight requirements.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. The term "connected" or "coupled to" may therefore include both direct coupling (in which two elements that are coupled to each other contact each other) and indirect coupling (in which at least one additional element is located between the two elements).

It is further noted that various method or process steps for embodiments of the present disclosure are described in the preceding description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. The use of the indefinite article "a" as used herein with reference to a particular element is intended to encompass "one or more" such elements, and similarly the use of the definite article "the" in reference to a particular element is not intended to exclude the possibility that multiple of such elements may be present.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. An exhaust system for an aircraft engine, comprising:
- a turbine exhaust duct (TED) having an annular inlet conduit extending around a central axis for directing combustion gases generally in an axial direction, and outlet conduits fluidly communicating with the annular inlet conduit and extending generally radially outward relative to the annular inlet conduit;
- an exhaust case surrounding the TED, the exhaust case having openings, each of the outlet conduits received through a respective one of the openings; and
- exhaust conduits secured to the exhaust case and each extending around a respective one of the openings of the exhaust case, an exhaust conduit of the exhaust conduits including a duct protruding away from the exhaust case along a port axis and fluidly communicating with a respective one of the outlet conduits, a stiffener disposed radially outwardly of the duct relative to the port axis and extending away from the exhaust case, and a reinforcement member secured to the stiffener to increase an effective thickness of the stiffener.

2. The exhaust system of claim 1, wherein the exhaust conduit includes a flange interconnecting the stiffener to the duct, the flange secured to the exhaust case.

3. The exhaust system of claim 1, wherein the reinforcement member is secured to the stiffener via a weld or braze joint.

4. The exhaust system of claim 1, wherein the reinforcement member includes two sections each extending from a forward end to a rearward end relative to a direction of travel of an aircraft equipped with the aircraft engine, the forward ends and the rearward ends being separated from each other via gaps.

5. The exhaust system of claim 1, wherein the reinforcement member is secured to an outer face of the stiffener, the outer face oriented away from the port axis.

6. The exhaust system of claim 1, wherein a thickness of the reinforcement member is greater than that of the stiffener, the thickness taken along a direction being normal to a contact plane between the reinforcement member and the stiffener.

7. The exhaust system of claim 1, wherein a height of the reinforcement member is greater than or equal to that of the stiffener, the height taken in a direction normal to the exhaust case.

8. The exhaust system of claim 2, wherein the stiffener, the duct, and the flange are parts of a single monolithic body of the exhaust conduit.

9. The exhaust system of claim 1, wherein outlet ends of the outlet conduits are secured to the exhaust conduits.

10. The exhaust system of claim 1, wherein a portion of a respective one of the outlet conduits extends inside the duct.

11. A reverse-flow gas turbine engine for an aircraft engine, comprising:
- an outer case assembly extending around a central axis and enclosing a core, the core including a compressor section and a turbine section, the turbine section located forward of the compressor section relative to a direction of travel of the aircraft engine, the outer case assembly including an exhaust case defining openings; and a turbine exhaust duct (TED) having an annular inlet conduit extending around the central axis for directing combustion gases generally in an axial direction and outlet conduits communicating with the annular inlet conduit and extending generally radially outward relative to the annular inlet conduit;

exhaust conduits secured to the exhaust case and each extending around a respective one of the openings of the exhaust case, the exhaust conduits secured to the exhaust case via flanges thereof, the exhaust conduits further including stiffening lips extending transversally to the exhaust case and extending at least partially around the openings; and reinforcement members secured to the stiffening lips and configured to increase a stiffness of the exhaust case.

12. The reverse-flow gas turbine engine of claim 11, wherein the exhaust conduits include ducts communicating with the outlet conduits and flanges interconnecting the stiffening lips to the ducts, the flanges secured to the exhaust case.

13. The reverse-flow gas turbine engine of claim 11, wherein the reinforcement members are secured to the stiffening lips via weld or braze joints.

14. The reverse-flow gas turbine engine of claim 11, wherein each of the reinforcement members includes two sections each extending from a forward end to a rearward end relative to the direction of travel, the forward ends and the rearward ends being separated from each other via gaps.

15. The reverse-flow gas turbine engine of claim 11, wherein the reinforcement members are secured to outer faces of the stiffening lips, the outer faces oriented away from the outlet conduits.

16. The reverse-flow gas turbine engine of claim 11, wherein a thickness of the reinforcement members is greater than that of the stiffening lips, the thickness taken along a direction being normal to contact planes between the reinforcement members and the stiffening lips.

17. The reverse-flow gas turbine engine of claim 11, wherein a height of the reinforcement members is greater than or equal to that of the stiffening lips, the height taken in a direction normal to the exhaust case.

18. The reverse-flow gas turbine engine of claim 12, wherein each of the exhaust conduits is a single monolithic body defining a respective one of the stiffening lips, a respective one of the ducts, and a respective one of the flanges.

19. The reverse-flow gas turbine engine of claim 11, wherein outlet ends of the outlet conduits are secured to the exhaust conduits.

20. The reverse-flow gas turbine engine of claim 11, wherein a portion of a respective one of the outlet conduits extends inside the duct.

* * * * *